United States Patent
Burr et al.

(10) Patent No.: US 9,296,277 B2
(45) Date of Patent: Mar. 29, 2016

(54) AIR EXHAUSTING DEVICE, IN PARTICULAR FOR A VEHICLE AND CORRESPONDING METHOD FOR EXHAUSTING AIR

(75) Inventors: Reinhold Burr, Heidenheim (DE); Dietrich Klingler, Heubach (DE); Klaus Voigt, Bietigheim-Bissingen (DE)

(73) Assignee: MAHLE International GmbH, Stuttgart (DE)

( * ) Notice: Subject to any disclaimer, the term of this patent is extended or adjusted under 35 U.S.C. 154(b) by 3273 days.

(21) Appl. No.: 10/548,721

(22) PCT Filed: Mar. 5, 2004

(86) PCT No.: PCT/EP2004/002295
§ 371 (c)(1),
(2), (4) Date: Oct. 10, 2006

(87) PCT Pub. No.: WO2004/080739
PCT Pub. Date: Sep. 23, 2004

(65) Prior Publication Data
US 2007/0060035 A1     Mar. 15, 2007

(30) Foreign Application Priority Data
Mar. 13, 2003 (DE) .................. 103 11 397

(51) Int. Cl.
*B60H 1/34* (2006.01)
*F24F 13/06* (2006.01)

(52) U.S. Cl.
CPC .............. *B60H 1/3457* (2013.01); *B60H 1/345* (2013.01); *B60H 1/3442* (2013.01); *F24F 13/06* (2013.01)

(58) Field of Classification Search
CPC ........................... B60H 1/3442; B60H 1/3457
USPC ............ 454/155, 152, 109, 108, 153, 154, 75
See application file for complete search history.

(56) References Cited

U.S. PATENT DOCUMENTS

| | | | |
|---|---|---|---|
| 3,503,320 A | | 3/1970 | Geromet |
| 4,259,898 A | * | 4/1981 | Finkelstein ............. F24F 13/06 454/292 |
| 4,437,392 A | | 3/1984 | Stouffer |
| 4,979,429 A | * | 12/1990 | Soethout .............. B60H 1/3442 454/162 |
| 5,003,867 A | * | 4/1991 | Sodec ..................... F24F 13/06 454/236 |
| 6,800,023 B2 | | 10/2004 | Demerath |
| 6,805,624 B2 | * | 10/2004 | Currle et al. .................. 454/152 |
| 2002/0094774 A1 | | 7/2002 | Demerath |
| 2004/0033776 A1 | | 2/2004 | Currle et al. |

(Continued)

FOREIGN PATENT DOCUMENTS

| | | |
|---|---|---|
| DE | 1778 267 | 3/1972 |
| DE | 2600534 A * | 7/1977 |

(Continued)

*Primary Examiner* — Steven B McAllister
*Assistant Examiner* — Brittany Towns
(74) *Attorney, Agent, or Firm* — Muncy, Geissler, Olds & Lowe, P.C.

(57) ABSTRACT

An air outflow device for a motor vehicle, having at least one fed-in air stream, wherein an outflow characteristic of the air outflow device can be changed between a dispersal characteristic and a spot characteristic, with the outflow characteristic being changed by an adjustable swirl on at least one outflowing air stream. Also an air outflow method using an adjustable swirl to adjust an outflow characteristic of an air stream.

16 Claims, 10 Drawing Sheets

(56) References Cited

U.S. PATENT DOCUMENTS

2006/0135054 A1    6/2006   Burr et al.
2007/0060035 A1    3/2007   Burr et al.

FOREIGN PATENT DOCUMENTS

| | | | |
|---|---|---|---|
| DE | 35 42 389 A1 | 6/1987 | |
| DE | 3711520 A1 * | 4/1988 | |
| DE | 88 08 280.6 U1 | 9/1988 | |
| DE | 37 36 448 A1 | 5/1989 | |
| DE | 4300226 A1 * | 4/1994 | ............ F24F 13/06 |
| DE | 197 21 831 A1 | 11/1998 | |
| DE | 299 14 962 U1 | 11/1999 | |
| DE | 100 36 776 A1 | 2/2002 | |
| DE | 102 19 696 A1 | 11/2003 | |
| DE | 102 43 974 A1 | 4/2004 | |
| DE | 10 2004 011 352 A1 | 9/2004 | |
| DE | EP 1496318 A2 * | 1/2005 | ............ F24F 13/06 |
| EP | 0 623 202 B1 | 11/1994 | |
| EP | 0 936 091 A1 | 8/1999 | |
| EP | 1 099 914 A1 | 5/2001 | |
| EP | 1 223 061 A2 | 7/2002 | |
| EP | 1 332 899 A2 | 8/2003 | |
| FR | 27 10 880 A1 | 4/1995 | |
| FR | 2772311 A1 * | 6/1999 | |
| JP | 52-94641 A | 8/1977 | |
| JP | 52094641 * | 8/1977 | |
| JP | 58-214409 | 12/1983 | |
| JP | 60-184713 U | 12/1985 | |
| JP | 60256747 A * | 12/1985 | |
| JP | 61-86529 A | 5/1986 | |
| JP | 61-152514 | 9/1986 | |
| JP | 5-87392 | 4/1993 | |
| JP | 05-073449 | 10/1993 | |
| JP | 10-246500 A | 9/1998 | |
| JP | 10246500 A * | 9/1998 | |
| JP | 2004-098905 | 4/2004 | |

\* cited by examiner

AIR EXHAUSTING DEVICE, IN PARTICULAR FOR A VEHICLE AND CORRESPONDING METHOD FOR EXHAUSTING AIR

FIELD OF THE INVENTION

The invention relates to an air outflow device, in particular for a motor vehicle.

BACKGROUND OF THE INVENTION

From EP 1 223 061 A2 an air outflow device, in particular for conditioning the air of a vehicle, having a frame, a plurality of lamellas which are arranged so as to be capable of pivoting about a first axis, and at least one coupling element to which each of the lamellas is coupled, with the coupling element being capable of being adjusted relative to the first axis between a neutral position in which the lamellas are parallel to one another and a comfort position in which at least some of the lamellas can be pivoted in opposite directions from one another. The air outflow device is arranged in front of an air duct from which an air stream exits, the direction of which air stream can be adjusted using the air outflow device. In this context, the air stream can be fanned out using the lamellas which are pivoted in opposite directions to one another so that a diverging air stream is generated in which there are lower flow speeds than with an air stream with a constant cross section so that even with a high air throughput rate it is possible to prevent the emerging air stream from striking an occupant of a vehicle at high speeds. However, such an air outflow device does not fulfill all requirements.

SUMMARY OF THE INVENTION

An object of the invention is to make available an improved air outflow device and an associated air outflow method.

The main idea of the invention is to change an outflow characteristic of an air outflow device by means of an adjustable swirl for at least one outflowing air stream. The outflow characteristic can preferably be changed between a dispersal characteristic and a spot characteristic. The adjustable swirl can be adjusted here between a maximum value for the dispersal characteristic and a minimum value for the spot characteristic.

Depending on an implemented embodiment of the invention, the swirl can be adjusted by changing the directing of the air and/or a quantity of air and/or an air speed and/or an outflow direction of the at least one outflowing air stream.

In one advantageous embodiment of the air outflow device according to the invention, at least one metering device and/or at least one air directing device are provided and used to change the directing of the air and/or the quantity of air and/or the air speed and/or the outflow direction of the at least one outflowing air stream in order to generate the swirl.

In another embodiment of the invention, the fed-in air stream is divided into at least two partial air streams in order to adjust the swirl, where a first partial air stream can be a swirl-free core air stream and a second partial air stream can be an outer air stream to which an adjustable swirl is applied, with the core air stream being capable of being influenced by the outer air stream or the outer air stream being capable of being influenced by the core air stream.

In a further development of the invention, the first and/or the second partial air stream can be formed from a plurality of sub air streams.

In one advantageous embodiment of the invention, only the second partial air stream is activated for a pure dispersal characteristic and only the first partial air stream is activated for a pure spot characteristic.

In order to achieve the various outflow characteristics, the outer air stream with the variable swirl is impressed on the core air stream, as a result of which the core air stream is advantageously destabilized and fanned out.

In one particularly advantageous embodiment of the air outflow device according to the invention, the air directing device is embodied in such a way that there is a central region and an outer region in the outflow region of the air directing device, with the central region generating the first partial air stream (core air stream) and the outer region generating the second partial air stream (outer air stream). For this purpose, the air directing device can have a helical or spiral region of extended length in order to generate the second partial air stream (outer air stream).

In one development of this particularly advantageous embodiment, the metering device is embodied in such a way that the individual partial air stream quantities and a mass flow air rate ratio of the first partial air stream to the second partial air stream can be controlled, with the metering device being able to control both the distribution of the at least one fed-in air stream among the individual component ducts and their metering.

In one advantageous embodiment of the invention, the metering device is arranged in the region of the air directing device, with the metering device comprising, for example, an actuating device which comprises a double flap which is controlled by means of a cam or kinematics, with the actuating device being able to be connected directly to an activation element via a shaft.

In another advantageous embodiment of the invention, the metering device is embodied as part of an air conditioning unit so that the metered individual partial air flow quantities are directed to the air directing device via corresponding air ducts.

BRIEF DESCRIPTION OF THE DRAWINGS

The invention is explained in more detail below with reference to the drawing, in which.

DETAILED DESCRIPTION

FIG. 1 comprises illustrations of possible outflow characteristics of a first embodiment of the invention in which an adjustable swirl is applied to a single fed-in air stream in order to change the outflow characteristics of an air outflow device 1.

Figure 1A:
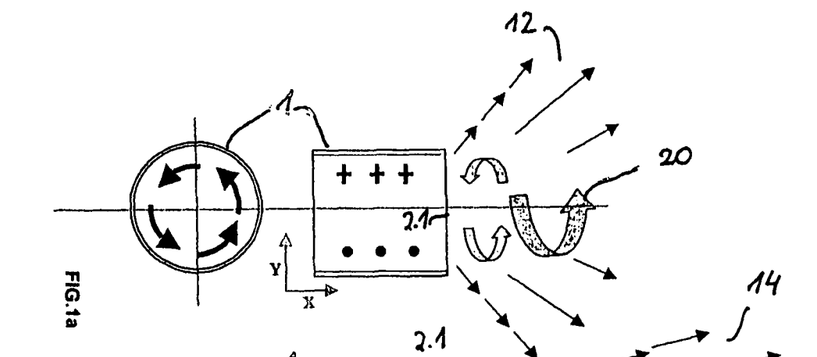
FIG. 1 is an illustration of possible outflow characteristics of a first embodiment of the invention.

FIG. 1*a* thus shows an air outflow device 1 for a motor vehicle in which the axially emerging air stream 20 has a strong swirl applied to it. For this reason, an outflow region 12 with a dispersal characteristic is formed in front of an outlet opening 2.1 of the air outflow device 1, that is to say the air stream 20 which emerges from the air outflow device 1 is fanned out to a great extent and there is only a small degree of distribution in the X direction.

Figures 1B, 1C:
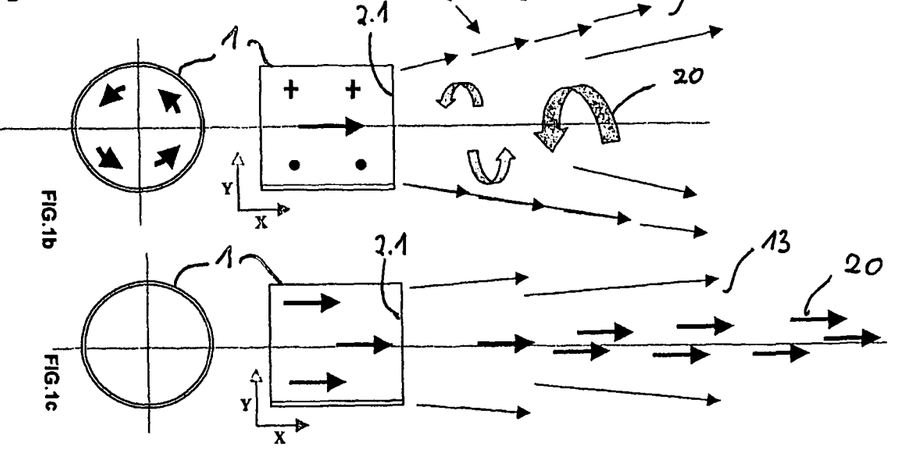

FIG. 1*b* shows an air outflow device 1 for a motor vehicle in which a swirl is applied to the axially emerging air stream 20. For this reason, an outflow region 14 with a mixed characteristic 12 is formed in front of the outlet opening 2.1 of the air outflow device 1, i.e. the air stream 20 which emerges from the air outflow device is fanned out to a lesser degree than for the dispersal characteristic and there is a moderate degree of distribution in the X direction.

FIG. 1*c* shows an air outflow device 1 for a motor vehicle in which a swirl is not applied to the axially emerging air stream 20. For this reason, an outflow region 13 with a spot characteristic is formed in front of the outlet opening 2.1 of the air outflow device 1, i.e. the air stream 20 which emerges from the air outflow device is hardly fanned out at all and there is a high degree of distribution in the X direction.

FIG. 2 comprises illustrations of possible outflow characteristics of a second embodiment of the invention in which a single fed-in air stream is divided into at least two partial air streams 9, 10, with a first partial air stream 10, in the illustrated exemplary embodiment what is referred to as a core air stream 10 without swirl, being directed to the air outlet 2.1 and a second partial air stream 9 being fed to the outlet opening 2.1, as what is referred to in the illustrated exemplary embodiment as an outer air stream 11 to which an adjustable swirl is applied. The core air stream 10 is directed in a core duct 5.5 and the outer air stream 11 is directed in an outer duct 5.4 of the air outflow device 1. 10. As a result of the splitting of the fed-in air stream 8 into a plurality of partial air streams, the described outflow characteristics can be defined and controlled better, and splitting, in particular into two partial air streams, can be implemented easily.

Figures 2A, 2B, 2C:
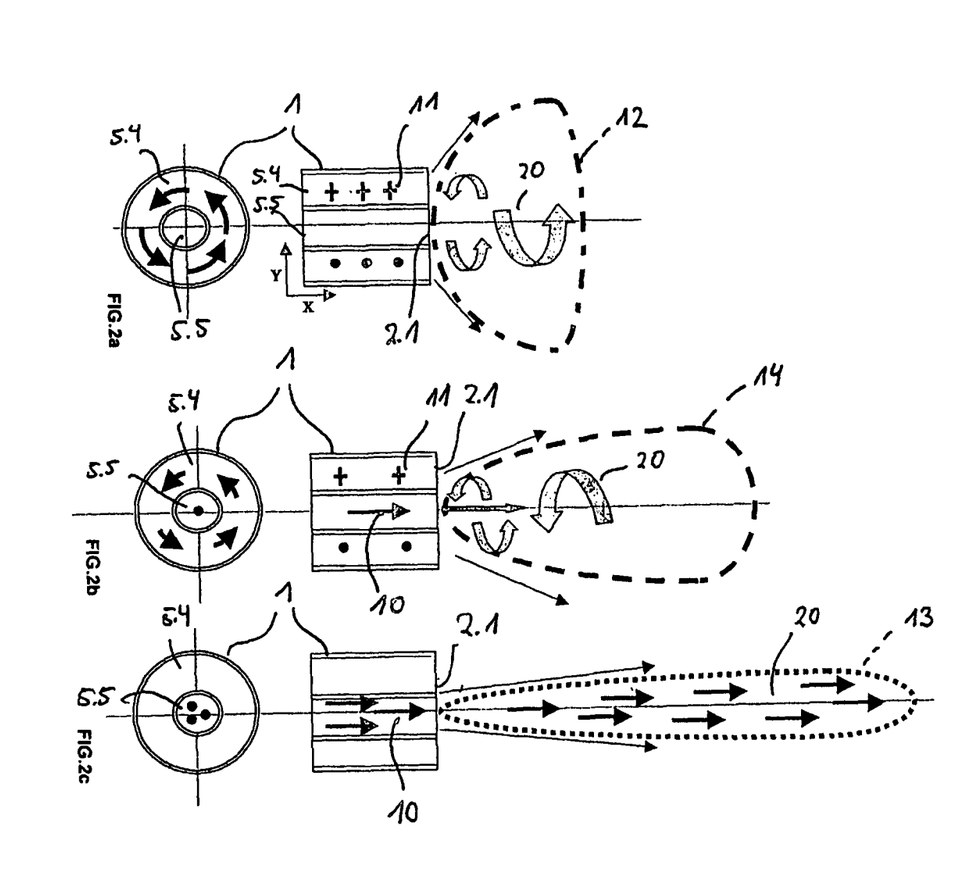
FIG. 2 is an illustration of possible outflow characteristics of a second embodiment of the invention.

Thus, FIG. 2*a* shows the air outflow device 1 in which only the outer air stream 11 to which a swirl is applied is directed to the outlet opening 2.1. For this reason, the outflow region 12 is formed with a dispersal characteristic in front of the outlet opening 2.1 of the air outflow device 1, i.e. the air stream 20 which emerges from the air outflow device 1 is fanned out to a great degree and there is only a small degree of distribution in the X direction. This outflow region is also referred to as a dispersal region or as a diffuse region.

FIG. 2*c* shows the air outflow device 1 for a motor vehicle in which only the core air stream 10 is directed to the outlet opening 2.1. For this reason, an outflow region 13 with a spot characteristic is formed in front of the outlet opening 2.1 of the air outflow device 1, i.e. the air stream 20 emerging from the air outflow device 1 is hardly fanned out and there is a high degree of distribution in the X direction. The outflow region 13 is also referred to as a spot region.

FIG. 2*b* shows the air outflow device 1 for a motor vehicle in which both the core air stream 10 and the outer air stream to which a swirl is applied is directed to the outlet opening 2.1. The two air streams 10, 11 influence one another and a third region 14 in which the two air streams 10, 11 are distributed is produced, with the shape of the third region 14 being dependent on the proportion of the two air streams involved in the distribution of air at a particular time. In other words, the core air stream 10 is destabilized as a function of the splitting up of the mass flow between the core air stream 10 and the outer air stream 11 by the swirl which is impressed by the outer air stream 11, and is correspondingly fanned out or the outer air stream 11 to which the swirl is applied is conveyed further in the X direction as a function of the splitting up of the mass flow by the core air stream 10, as a result of which the fanning out by the swirl only becomes effective at a relative large distance from the outflow opening 2.1. As a result, any possible distribution of air or outflow of characteristic can be implemented between the two extreme values of only outer air stream 11 and dispersal characteristic or only core air stream 10 and spot characteristic as a function of the splitting up of the mass air flow.

Figure 3:
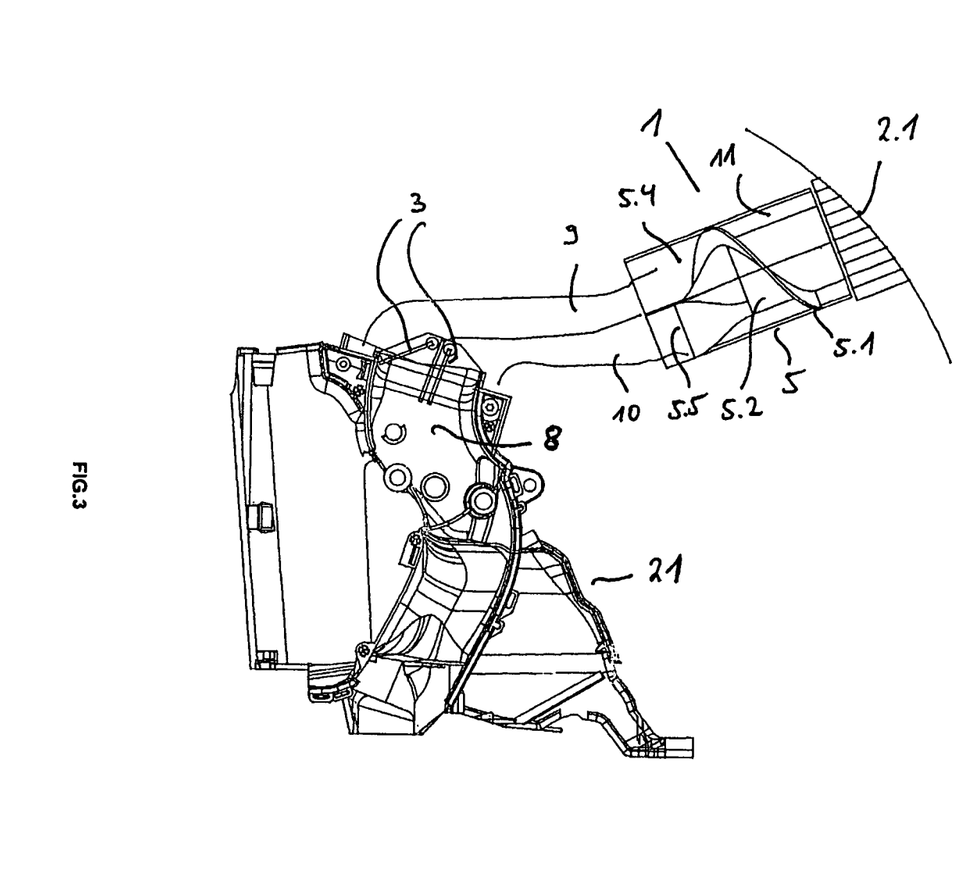
FIG. 3 is a schematic illustration of the directing of the air with an air outflow device for a motor vehicle.

FIG. 3 shows a schematic illustration of the directing of the air with an air outflow device 1 according to the invention in a motor vehicle. The air outflow device corresponds here to the second embodiment described above, i.e. a first partial air stream 10 is directed via the core duct 5.5 to the outlet opening 2.1, and a second partial air stream 9 has a swirl applied to it in the outer duct 5.4 by corresponding air directing elements 5.1 and is directed to the outlet opening 2.1 as an outer air stream 11 to which a swirl is applied. The splitting up of the air of the fed-in air stream 8 is adjusted here by means of a metering device which is arranged in an air conditioning unit 21 and is implemented in the illustrated exemplary embodiment by two flaps with associated actuation means.

Figures 4A, 4B:
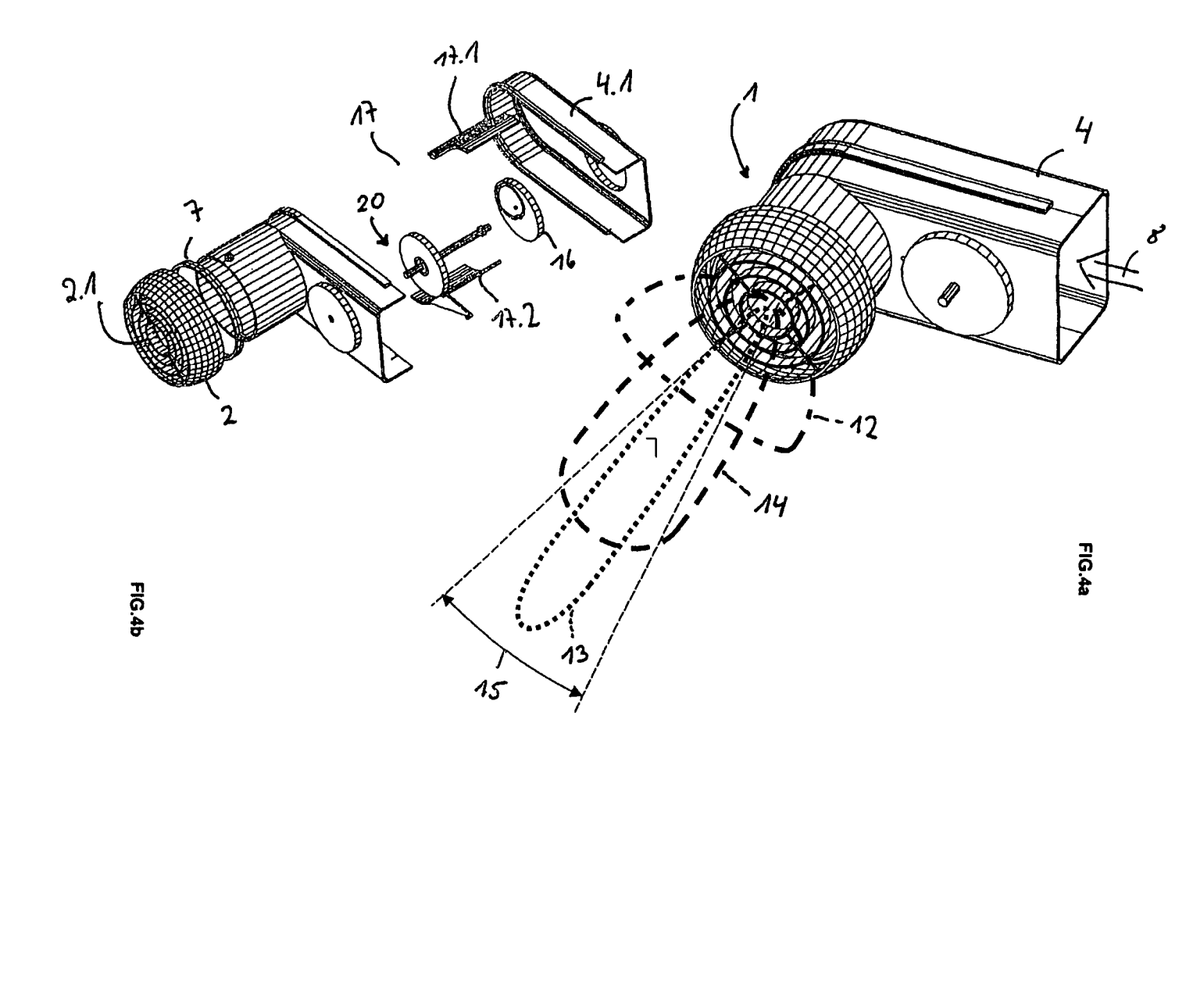
FIG. 4a is a schematic illustration of a first exemplary embodiment of the invention with outflow characteristics.
FIG. 4b is a schematic illustration of individual components of the first exemplary embodiment of the invention.

FIG. 4 shows a possible embodiment of the first exemplary embodiment of the invention. FIG. 4*a* shows a schematic illustration of the first exemplary embodiment of the invention with various outflow characteristics and FIG. 4*b* shows a schematic illustration of individual components of the first exemplary embodiment. As is apparent from FIGS. 4*a* and 4*b*, the air outflow device 1 in the first exemplary embodiment is adjoined by an air duct 4 which feeds in an air stream 8. The air outflow device 1 comprises a metering/air distribution device 17 which is arranged in the air duct 4. The metering/air distribution device 17 comprises a two-component air directing blade 17.1, 17.2 and a cam 16 with associated drive 20, with the air directing blade comprising an upper blade 17.1 and a lower blade 17.2. The metering/air distribution device 17 is adjoined by a swivel ring 7 and a swivelable shutter 2 with the outlet opening 2.1 for adjusting the outflow direction within the swivel region 15. The first, second and third regions 12, 13, 14 of the air distribution, already described, in front of the outflow opening 2.1 and the associated outflow characteristics are obtained with the air outflow device 1 as explained below with reference to FIGS. 5*a* to 5*d*.

FIG. 5 shows the air duct 5 with removed air duct upper part 4.1 and the metering/air distribution device 17 which is arranged therein, with different positions of the two blades 17.1, 17.2 for achieving the different outflow characteristics.

Figure 5A:
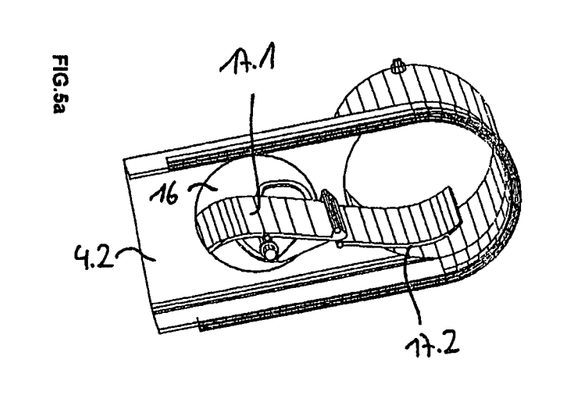
FIGS. 5a to 5d are illustrations of a metering device and of an air directing device of the first exemplary embodiment for different set outflow characteristics.

FIG. 5*a* shows the two blades 17.1, 17.2 in a center position in order to achieve the outflow characteristics of the third region 14 which is illustrated in FIG. 1*b* and in which the axially emerging air stream has a swirl applied to it, with the spot characteristic being enlarged in the direction of the lower air duct wall by lowering the lower blade 17.2, and with the dispersal characteristic being increased in the direction of the upper air duct wall by raising the upper blade 17.1.

Figure 5B:
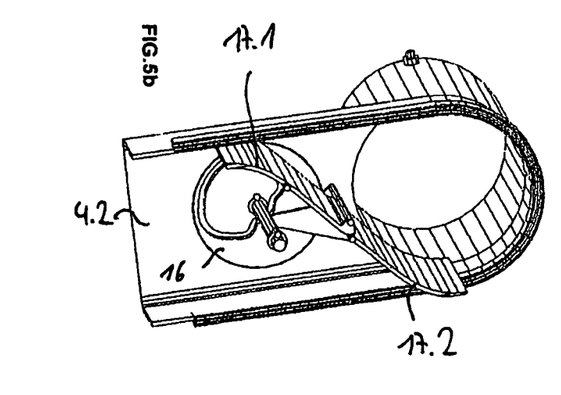

FIG. 5b shows the position of the two blades 17.1, 17.2 in a closed position of the air outflow device 1 in which no air stream emerges at the outflow opening 2.1, i.e. the two blades 17.1, 17.2 shut off the entire cross-sectional area of the air duct 4, with the upper blade 17.1 resting in a seal-forming fashion against an upper wall, and the lower blade 17.2 resting in a seal-forming fashion against a lower wall of the air duct 4.

Figure 5C:
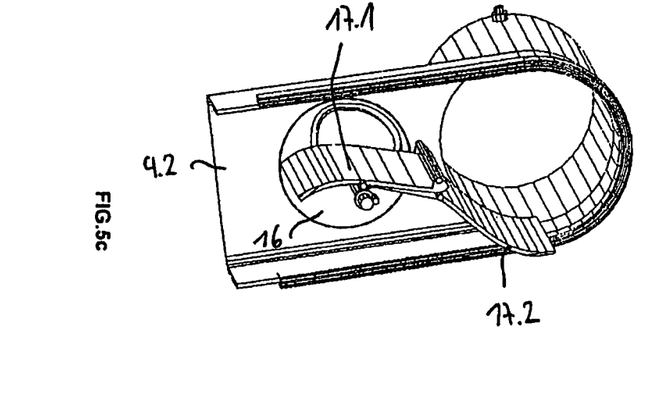

FIG. 5c shows a position of the blades 17.1, 17.2 with which the spot outflow characteristic of the second region 13 which is illustrated in FIG. 1c is obtained. The upper blade 17.1 is located here in a virtually horizontal position, while the lower blade 17.2 closes the lower region of the air duct 4 so that the air stream at the upper side of the blades 17.1, 17.2 is directed to the outflow opening 2.1 virtually without swirl.

Figure 5D:
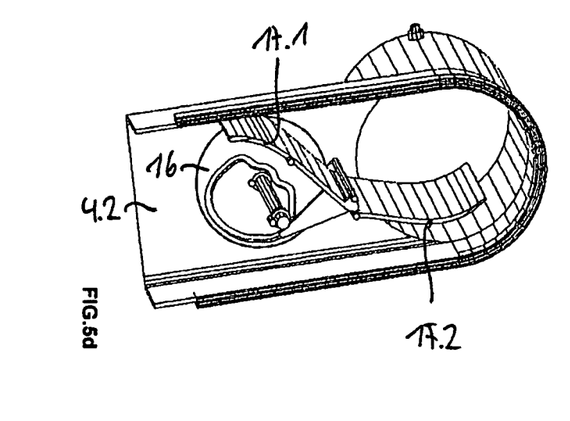

FIG. 5d shows a position of the blades 17.1, 17.2 with which the dispersal outflow characteristic of the first region 12 which is illustrated in FIG. 1a is obtained. The lower blade 17.2 is located here in a virtually horizontal position, while the upper blade 17.1 closes the upper region of the air duct 4 in a seal-forming fashion so that the air stream is directed along the underside of the blades 17.1, 17.2 into an edge region of the air duct 4, as a result of which a swirl is impressed on the air stream and the air stream is then directed to the outflow opening 2.1 with said swirl.

Figures 6A, 6B:
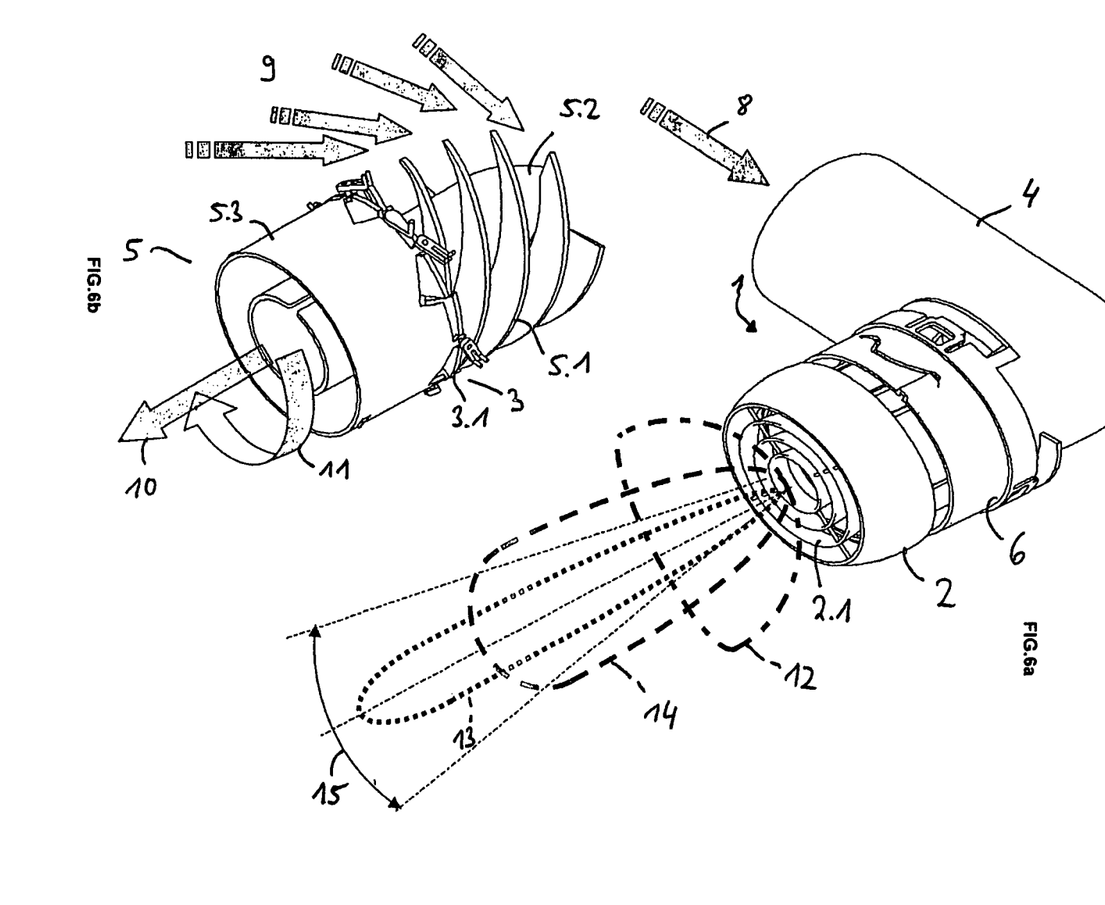
FIG. 6a is a schematic illustration of a second exemplary embodiment of the invention with outflow characteristics.
FIG. 6b is a schematic illustration of the directing of the air within the air directing device of the second exemplary embodiment.
Figure 6C:
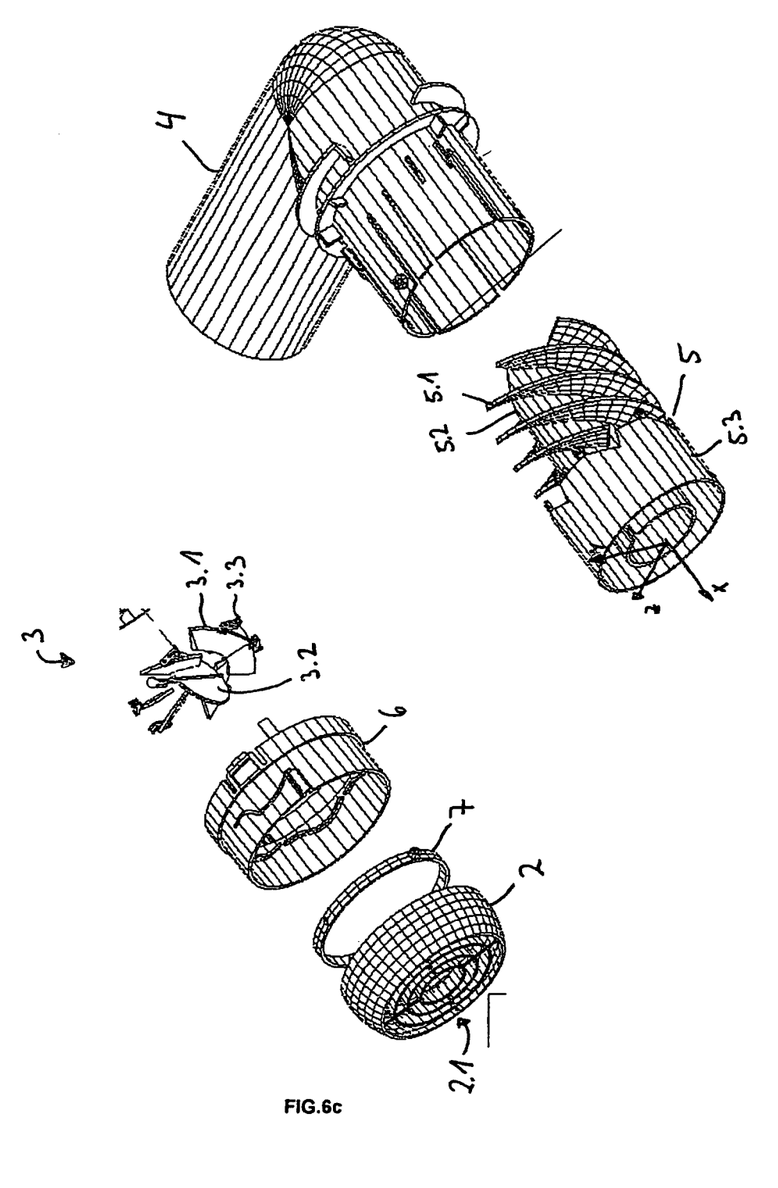
FIG. 6c is a schematic illustration of individual components of the second exemplary embodiment of the invention.

As is apparent from FIG. 6c, the second exemplary embodiment of the air outflow device 1 according to the invention comprises a shutter 2 with outflow opening 2.1, a metering device 3, an air directing device 5, an activation ring 6 and a swivel ring 7, with the air outflow device 1 adjoining an air duct 4.

Figure 9:
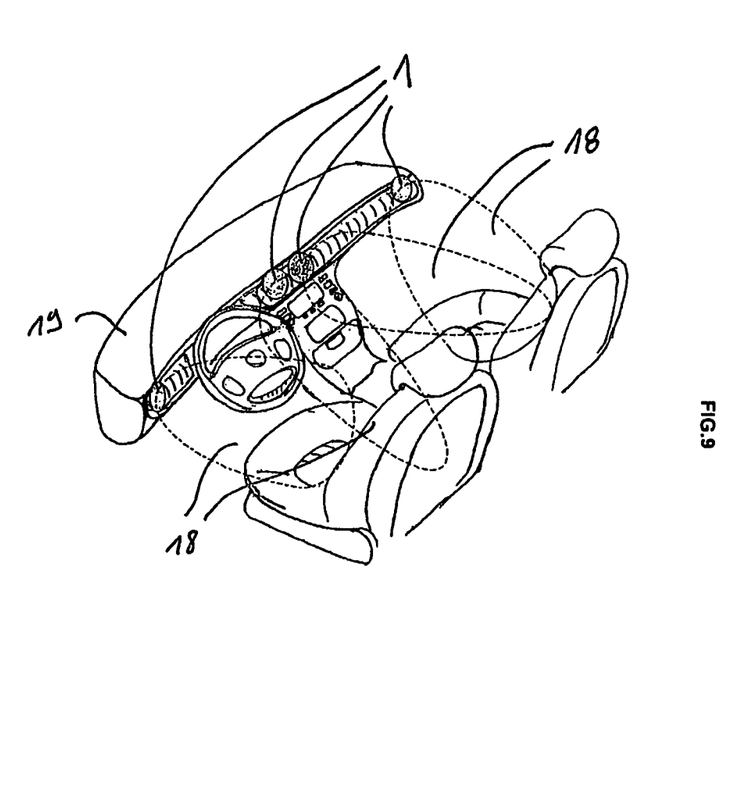
FIG. 9 is an illustration of a passenger compartment of a vehicle with the air outflow devices according to the invention.

Thus, FIG. 6a shows a completely assembled air outflow device 1 in which the air directing device 5 is inserted into the air duct 4, with the metering device 3 being arranged in the region of the air directing device 5 (see FIG. 6b), in which, in order to adjust the metering device 4, the activation ring 6 is pushed over a front region 5.3 of the air directing device 5 until the activation ring 6 engages in the metering device 3. The air directing device 5 divides an air stream 8, fed to the air outflow device 1 via the air duct, into two partial air streams 9 and 10 by means of air directing elements 5.1, 5.2, as is apparent from FIG. 6b, with the metering device 3 comprising means 3.2 for metering the first partial air stream 10, and means 3.1 for metering the second partial air stream 9, and the means for metering 3.1, 3.2 preferably comprising individual flaps or air directing elements which can be adjusted by the activation ring 6 by means of corresponding engagement means 3.3 which are arranged on the metering device 3. A swirl is impressed on the second partial air stream 9 by means of the directing elements 5.1 or by means of the metering device 3 so that the second partial air stream 9 leaves the air directing device as a second partial air stream 11 to which a swirl is applied. The air directing element 5.2 feeds the first partial air stream 10 to the shutter 2 through the air directing device without impressing a swirl on it, and said shutter 2 forms, with the swivel ring 7, a device for adjusting a swivel region 15 of the air outflow device 1 with which the direction of the air stream in the region of an outflow opening 2.1 can be adjusted. The outflow opening 2.1, and thus also the device 2, 7 for adjusting the direction of the air stream, are installed in a dashboard 19 (see FIG. 9) of a motor vehicle and the vehicle occupant can thus directly set a desired direction of the air stream and also vary the outflow regions 18 which are associated with the individual air outflow devices 1.

Figure 7A:
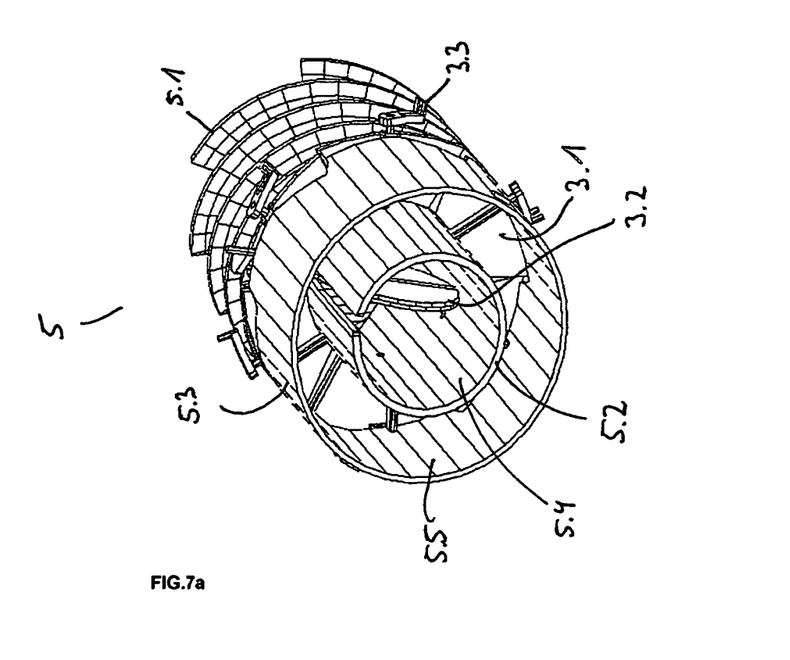
FIG. 7a is a schematic illustration of the air directing device of the second exemplary embodiment.
Figure 7B:
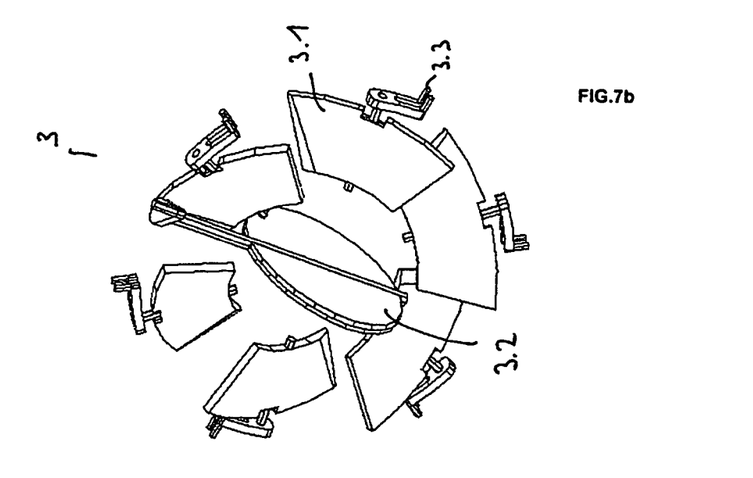
FIG. 7b shows a schematic illustration of the metering device of the second exemplary embodiment.

FIGS. 7a and 7b show the air directing device 5 with the metering device 3 and the metering device 3 in detail. As is apparent from FIG. 7b, the metering device 3 comprises first flaps 3.1 for metering the second air stream 9 or the outer air stream 11, and a second flap 3.2 for metering the first air stream 10 or the core stream. In addition, means 3.3 are provided which engage in the activation ring 6 (illustrated in FIG. 6) so that the flaps 3.1, 3.2 can be adjusted by means of the activation ring 6 in order to meter the partial air streams 9, 10. The directing of air and/or the quantity of air and/or the air speed and thus the outflow characteristic of the fed-in air stream 8 can be varied with the metering device 3 and/or the air directing device 5 in order to generate the swirl.

As is apparent from FIG. 7a, the air directing device 5 divides the fed-in air stream 8 in the illustrated exemplary embodiment into two partial air streams. The division is carried out in the radial direction so that in a central region 5.4 of the air directing device 5 the core air stream is directed in an axial direction in a core duct 5.4 to the outflow opening 2.1, and in an external region 5.5 the outer air stream 11 to which a swirl is applied is directed into an outer duct 5.5 to the outflow opening 2.1. The second partial air stream 9 is directed around the central core duct 5.4 by the air directing elements 5.1 in the shape of a helix and is provided with a swirl in the clockwise direction or counterclockwise direction depending on the orientation of the air directing elements 5.1, as is indicated in the figures by corresponding arrows in the region of the air outlet. In contrast to the illustrated exemplary embodiment, it is however also conceivable to apply a swirl to the core air stream 10, directed in the central region 5.4, by means of suitable air directing elements and to direct it to the outflow opening 2.1 and to direct the outer air stream 11, guided in the outer region, to the outflow opening 2.1 essentially without swirl.

As is apparent from FIGS. 6b and 7a, the partial air streams can be divided further into sub air streams, which is the case for the second partial air stream 9 in the illustrated first exemplary embodiment. Here, the individual air directing elements 5.1 form a plurality of component outer ducts whose flow cross sections can be changed individually or together by means of corresponding flaps 3.1 in the metering device 3. The individual component ducts are combined again to form an outer duct 5.5 in the front region of the air directing device 5.3, in which outer duct 5.5 the outer air stream 11 to which swirl is applied is directed to the outflow opening 2.1.

The metering device 3 is adjusted directly by means of the vehicle occupant using an activation element which is arranged on the dashboard 19, or automatically by an open-loop/closed-loop control unit in accordance with a ventilation and/or air-conditioning program which is selected by the user.

Figures 8A, 8B:
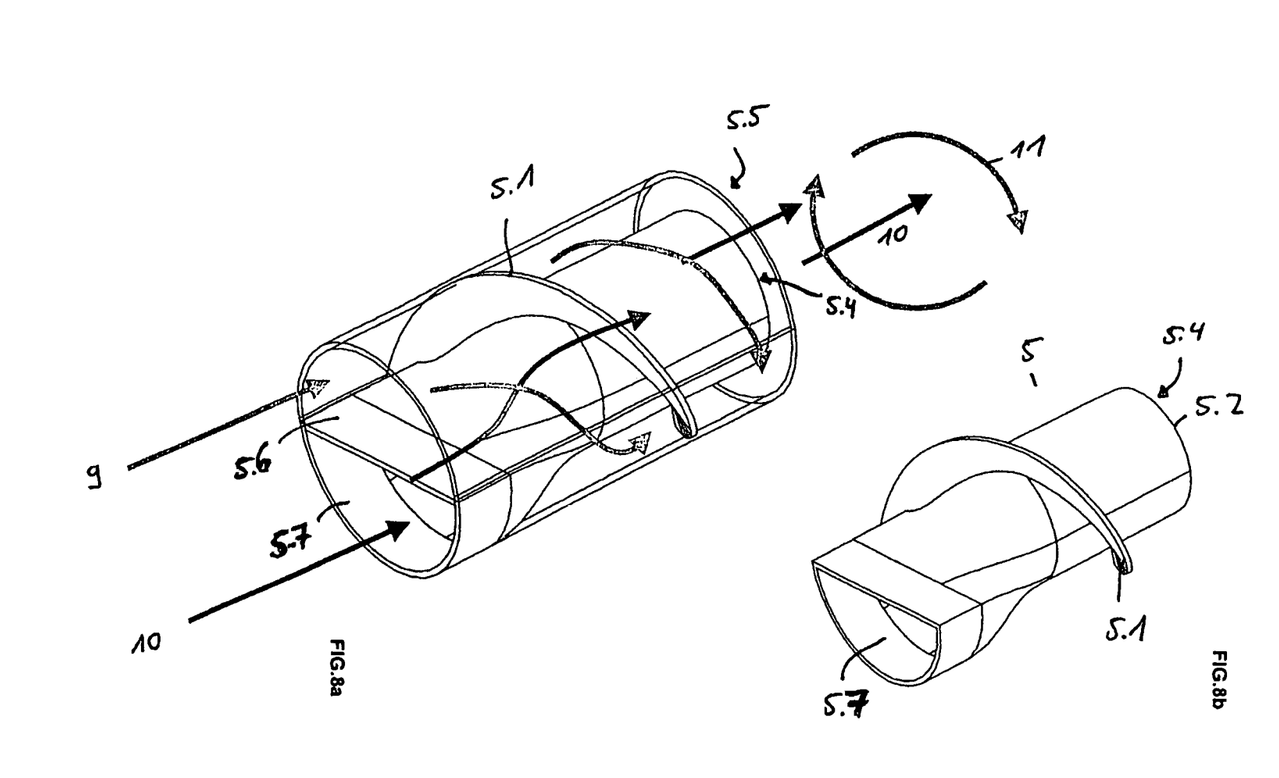
FIG. 8 is a schematic illustration of a further exemplary embodiment of an air directing device.

FIG. 8 is a detailed view of the air directing device 5 illustrated in FIG. 3. As already stated, the metering and the splitting of the air stream 8 already take place in the air conditioning unit 21. As in FIG. 8a, the first partial air stream 10 and the second partial air stream 9 are fed to the air directing device 5 via corresponding air ducts. The first partial air stream 10 enters the air directing device 5 in a lower region 5.7 and leaves the outflow opening 2.1 in a core duct 5.4 as a core air stream. The second partial air stream 9 enters the air directing device 5 in an upper region 5.6, a swirl is applied to it by an air directing element 5.1 and leaves the outflow opening 2.1 in an outer duct 5.5 as an outer air stream 11. The second partial air stream 9 is directed around the central core duct 5.5 in a helical shape by the air directing elements 5.1 and is provided with a swirl in the clockwise direction or in the counterclockwise direction depending on the orientation of the air directing elements 5.1, as is indicated in the figures by corresponding arrows in the region of the air outlet. In contrast to the illustrated exemplary embodiment, it is however also conceivable to apply a swirl to the core air stream 10 by means of suitable air directing elements and to direct it to the outflow opening 2.1 and to direct the outer air stream 11 to the outflow opening 2.1 essentially without swirl.

The invention claimed is:

1. An air outflow device for a motor vehicle, having at least one fed-in air stream wherein an air directing device divides the at least one fed-in air stream into a first partial air stream via a core duct and a second partial air stream via an outer duct, wherein an outflow characteristic of the air outflow device is configured to be changed between a dispersal characteristic and a spot characteristic, with the outflow characteristic being changed by an adjustable swirl being applied on at least one outflowing air stream, the air outflow device further including at least one metering device for controlling the first partial air stream independently of the second partial air stream, wherein the at least one metering device comprises a double flap having an upper curved blade and a lower curved blade on a common shaft that follow along a track of a cam.

2. The air outflow device as claimed in claim 1, wherein the at least one metering device is connected directly to an activation element via the shaft.

3. The air outflow device as claimed in claim 1, wherein a component that is configured to adjust the at least one outflowing air stream and/or at least one partial air stream is arranged in an air conditioning unit.

4. The air outflow device as claimed in claim 1, wherein the swirl of the at least one air stream is configured to be adjusted between a maximum value for the dispersal characteristic and a minimum value for the spot characteristic.

5. The air outflow device as claimed in claim 1, wherein the swirl is adjustable by changing the directing of the air and/or a quantity of air and/or an air speed and/or an outflow direction of the at least one outflowing air stream.

6. The air outflow device as claimed in claim 5, including at least one air directing device with which the directing of the air and/or the quantity of air and/or the air speed and/or the outflow direction of the outflowing air stream is changeable in order to generate the swirl.

7. The air outflow device as claimed in claim 1, wherein the first partial air stream is a swirl-free core air stream and the second partial air stream is an outer air stream to which the adjustable swirl is applied.

8. The air outflow device as claimed in claim 7, wherein the core air stream can be influenced by the outer air stream or the outer air stream can be influenced by the core air stream.

9. The air outflow device as claimed in claim 7, wherein the first and/or second partial air streams are formed from a plurality of sub air streams.

10. The air outflow device as claimed in claim 1, wherein only the second partial air stream is activated for the dispersal characteristic.

11. The air outflow device as claimed in claim 1, wherein only the first partial air stream is activated for the spot characteristic.

12. The air outflow device as claimed in claim 1, wherein the second partial air stream is impressed on the first partial air stream with a variable swirl, as a result of which the first partial air stream is destabilized and fanned out.

13. The air outflow device as claimed in claim 1, wherein the air outflow device is embodied in such a way that a central region and an outer region are provided in an outflow region of the air outflow device, with the central region generating the first partial air stream, and with the outer region generating the second partial air stream.

14. The air outflow device as claimed in claim 1, wherein the air outflow device has a helical or spiral region of extended length for generating the second partial air stream.

15. The air outflow device as claimed in claim 1, wherein the metering device is embodied in such a way that the individual partial air flow quantities and a mass flow rate ratio of the first partial air stream to the second partial air stream can be controlled.

16. The air outflow device as claimed in claim 1, wherein the metering device controls both the splitting up of the at least one fed-in air stream among the individual component ducts and their metering.

* * * * *